(12) United States Patent
Choi et al.

(10) Patent No.: US 7,497,771 B2
(45) Date of Patent: Mar. 3, 2009

(54) VENTILATING SYSTEM

(75) Inventors: Keun Hyoung Choi, Seoul (KR); Jeong Yong Kim, Seoul (KR); Ho Seon Choi, Seoul (KR); Kwan Ho Yum, Seoul (KR); Ju Youn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 11/106,607

(22) Filed: Apr. 15, 2005

(65) Prior Publication Data
US 2006/0035579 A1    Feb. 16, 2006

(30) Foreign Application Priority Data
Jul. 28, 2004    (KR) .................. 10-2004-0059268

(51) Int. Cl.
| F24F 7/10 | (2006.01) |
| F25D 17/08 | (2006.01) |
| B01D 45/00 | (2006.01) |
| F25D 7/18 | (2006.01) |

(52) U.S. Cl. ................ 454/252; 62/419; 55/467
(58) Field of Classification Search ........ 454/230, 454/232, 237, 246, 248
See application file for complete search history.

(56) References Cited

U.S. PATENT DOCUMENTS

| 4,955,997 | A | * | 9/1990 | Robertson, III | ........ 96/138 |
| 5,941,767 | A | * | 8/1999 | Fukuda | ........ 454/230 |
| 5,987,908 | A | | 11/1999 | Wetzel | |
| 6,217,281 | B1 | * | 4/2001 | Jeng et al. | ........ 415/119 |
| 6,287,191 | B1 | * | 9/2001 | Barker, II | ........ 454/248 |
| 6,319,115 | B1 | * | 11/2001 | Shingaki | ........ 454/186 |

(Continued)

FOREIGN PATENT DOCUMENTS

CN    1293342 A    5/2001

(Continued)

OTHER PUBLICATIONS

English translation of It JP 2001-248865 reference.*

*Primary Examiner*—Steve McAllister
*Assistant Examiner*—Helena Kosanovic
(74) *Attorney, Agent, or Firm*—Birch, Stewart, Kolasch & Birch, LLP

(57) ABSTRACT

A compact ventilating system having an air purifying function is disclosed, which includes a case having one end buried in a ceiling of a room, and the other end projected toward the inside of the room; an air-supplying passage of communicating the outside of the room, the case, and the inside of the room with one another, to supply an outdoor air to the inside of the room; an air-discharging passage of communicating the inside of the room, the case, and the outside of the room with one another, to discharge an indoor air to the outside of the room; an air-circulating passage of communicating the inside of the room with one point of the air-supplying passage inside the case, to introduce the indoor air to the case, and to re-supply the air to the inside of the room; and a fan provided in the case, for supplying the outdoor air introduced to the case through the air-supplying passage to the inside of the room, or re-supplying the indoor air introduced to the case through the air-circulating passage to the inside of the room.

19 Claims, 10 Drawing Sheets

U.S. PATENT DOCUMENTS 6,569,010 B1 * 5/2003 Miller et al. ................ 454/236
6,619,063 B1 * 9/2003 Brumett ....................... 62/264

FOREIGN PATENT DOCUMENTS

| JP | 1-124500 A | 5/1989 |
| JP | 04-068246 A | 3/1992 |
| JP | 05-015718 | 1/1993 |
| JP | 8-178349 A | 7/1996 |
| JP | 8-226668 A | 9/1996 |
| JP | 10-281523 A | 10/1998 |
| JP | 2001-227772 A | 8/2001 |
| JP | 2001-248865 * | 9/2001 |
| JP | 2001-304612 A | 10/2001 |
| KR | 10-2003-0063843 A | 7/2003 |

* cited by examiner

VENTILATING SYSTEM

CROSS-REFERENCE TO RELATED APPLICATIONS

This application claims the benefit of Korean Application No. P2004-59268, filed on Jul. 28, 2004, which is hereby incorporated by reference as if fully set forth herein.

BACKGROUND OF THE INVENTION

1. Field of the Invention

The present invention relates to a ventilating system, and more particularly, to a compact ventilating system having an air purifying function.

2. Discussion of the Related Art

In case many people stay in a closed room, such as an office or a vehicle, the closed room is polluted with carbon dioxide, and the like, produced when the people breathe quickly, and the polluted air affects human bodies. Therefore, it is necessary to change the polluted room air with outdoor fresh air, for which a ventilating system is generally used. Such a ventilating system is installed inside a ceiling, for forced discharge of room air and introduction of outdoor air into the room.

In order to install the ventilating system, it is necessary to obtain a sufficient room for the ventilating system between a ceiling and a floor of an upper story. Accordingly, a distance between a floor of a lower story and a floor of an upper story, a height of one story, increases, thereby lowering the spatial efficiency and the economical efficiency in a building.

In the meantime, currently, for more comfortable room environment, an air purifier as well as the ventilating system is provided in the room, for collecting dust or microbes from the room air, thereby requiring an additional cost for the air purifier.

Also, the air purifier is installed on a room floor, for purifying the outdoor air introduced into the room. In this state, it is difficult to improve the efficiency in removing the dust from the room air. Besides, in case the air purifier is installed on the room floor, infants and children can touch the air purifier, so that it may cause safety troubles and damages in the air purifier.

Furthermore, since the ventilating system and the air purifier are separately provided in the room, in case of that the outdoor air introduced to the inside of the room is polluted, the polluted outdoor air is directly provided to the inside of the room when ventilating the room air with the ventilating system. As a result, the polluted outdoor air is directly provided to the inside of the room, so that it is impossible to obtain the comfortable room environment.

SUMMARY OF THE INVENTION

Accordingly, the present invention is directed to a ventilating system that substantially obviates one or more problems due to limitations and disadvantages of the related art.

An object of the present invention is to provide a ventilating system having a modified structure not to increase a distance between a floor of a lower story and a floor of an upper story.

Another object of the present invention is to provide a ventilating system having a modified structure of purifying an outdoor air and providing the purified air to the inside of a room when ventilating a room air.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ventilating system includes a case having one end buried in a ceiling of a room, and the other end projected toward the inside of the room; an air-supplying passage of communicating the outside of the room, the case, and the inside of the room with one another, to supply an outdoor air to the inside of the room; an air-discharging passage of communicating the inside of the room, the case, and the outside of the room with one another, to discharge an indoor air to the outside of the room; an air-circulating passage of communicating the inside of the room with one point of the air-supplying passage inside the case, to introduce the indoor air to the case, and to re-supply the air to the inside of the room; and a fan provided in the case, for supplying the outdoor air introduced to the case through the air-supplying passage to the inside of the room, or re-supplying the indoor air introduced to the case through the air-circulating passage to the inside of the room.

At this time, the case is formed in a flat-quadrant shape, for being positioned at a corner of the ceiling in the room. Also, the case has two sides being adhered to the corner of a wall in the room. The case is formed in a flat-quadrate shape, and one side of the case is positioned adjacent to the wall of the room. In addition, the case has a round frontal side for supplying the indoor air or the outdoor air introduced to the inside of the case to the inside of the room.

The ventilating system further includes a louver provided in the air-circulating passage, for opening and closing the air-circulating passage. In the ventilating system, there is a preheat exchanger provided at an intersection between an air-supplying duct and an air-discharging duct, for indirect heat-exchange of the outdoor air supplied to the inside of the room and the indoor air discharged to the outside of the room. Also, the ventilating system includes a damper provided in the air-supplying passage, for opening and closing the air-supplying passage. In this state, the fan inhales the air at an axis direction, and then discharges the air at a radius direction.

The air-supplying passage includes a first port provided in the side of the case; an air-supplying duct connected with the first port, and being in communication with the outside of the room by penetrating the wall; and an air-discharging hole provided in the front of the case. Also, the air-discharging holes are formed at both sides adjacent to the front side of the case. The first port is provided at a lower portion in the side of the case under the ceiling of the room. The air-supplying passage further includes a guide passage slantingly provided from an inner upper portion of the case to the air-discharging hole.

The air-discharging passage includes a second inlet provided on the bottom of the case; a second port provided in the side of the case; and an air-discharging duct connected with the second port and being in communication with the outside of the room by penetrating the wall. The second port is provided at a lower portion in the side of the case under the ceiling of the room.

The air-circulating passage includes a first inlet provided on the bottom of the case; and an air-discharging hole provided in the front of the case. The air-discharging holes are formed at both sides adjacent to the front side of the case.

The case includes a division plate for dividing the inner space of the case into a lower space and an upper space, and an opening provided in the division plate to communicate the lower space of the case with the upper space of the case, and the fan is provided to inhale the air from the lower space of the case and to discharge the inhaled air to the upper space of the case. Also, the case further includes an air guide, for separating the air-supplying passage from the air-discharging passage. The air-supplying passage and the air-discharging passage pass through the case under the ceiling of the room by penetrating the wall of the room.

In addition, the ventilating system includes a filter member provided in the case, for purifying the indoor air or the outdoor air introduced to the case, wherein the filter member includes a dust-colleting filter, photo-catalyst, and active carbon, which are provided in the case. The filter member may be formed of an HEPA (High Efficiency Particulate Arrestor) filter which can remove particles and bacteria, larger than 0.3 micron. The filter member may be formed of a ULPA (Ultra Low Penetration Absolute) filter which can remove particles and bacteria, with a size ranging 0.01~0.1 micron.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a ventilating system according to the first embodiment of the present invention will be described with reference to the accompanying drawings.

Figure 1:
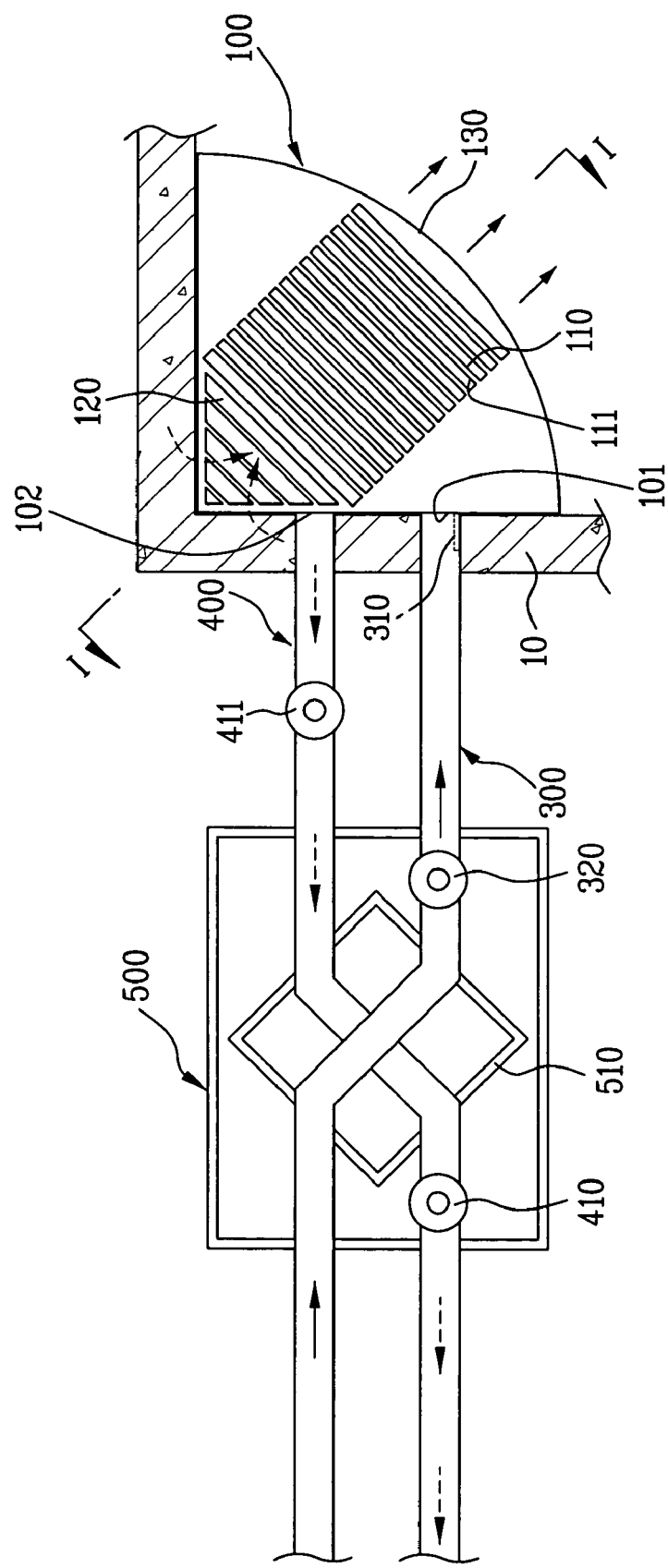
FIG. 1 is a schematic diagram of illustrating a ventilating system according to the first embodiment of the present invention.
Figure 2:
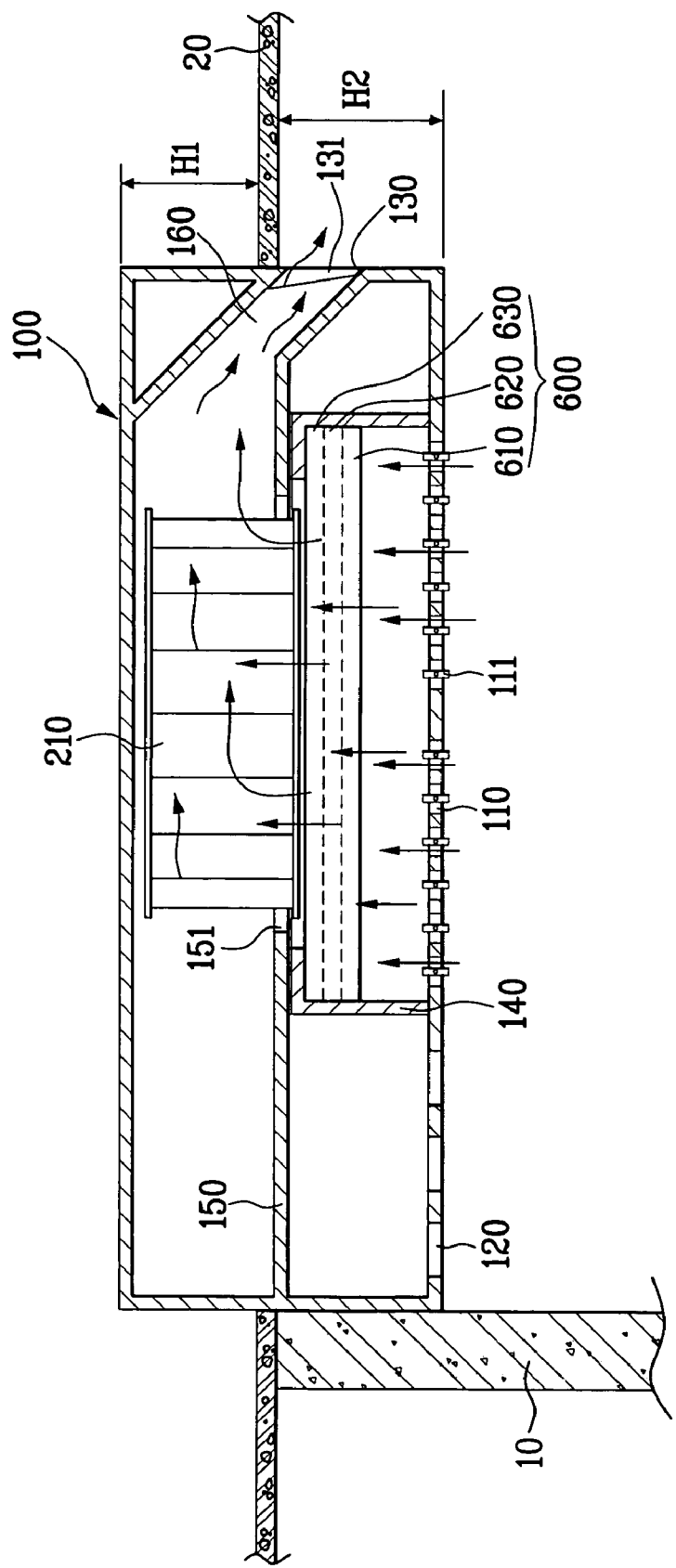
FIG. 2 is a cross sectional view along I-I' of FIG. 1.
Figure 3:
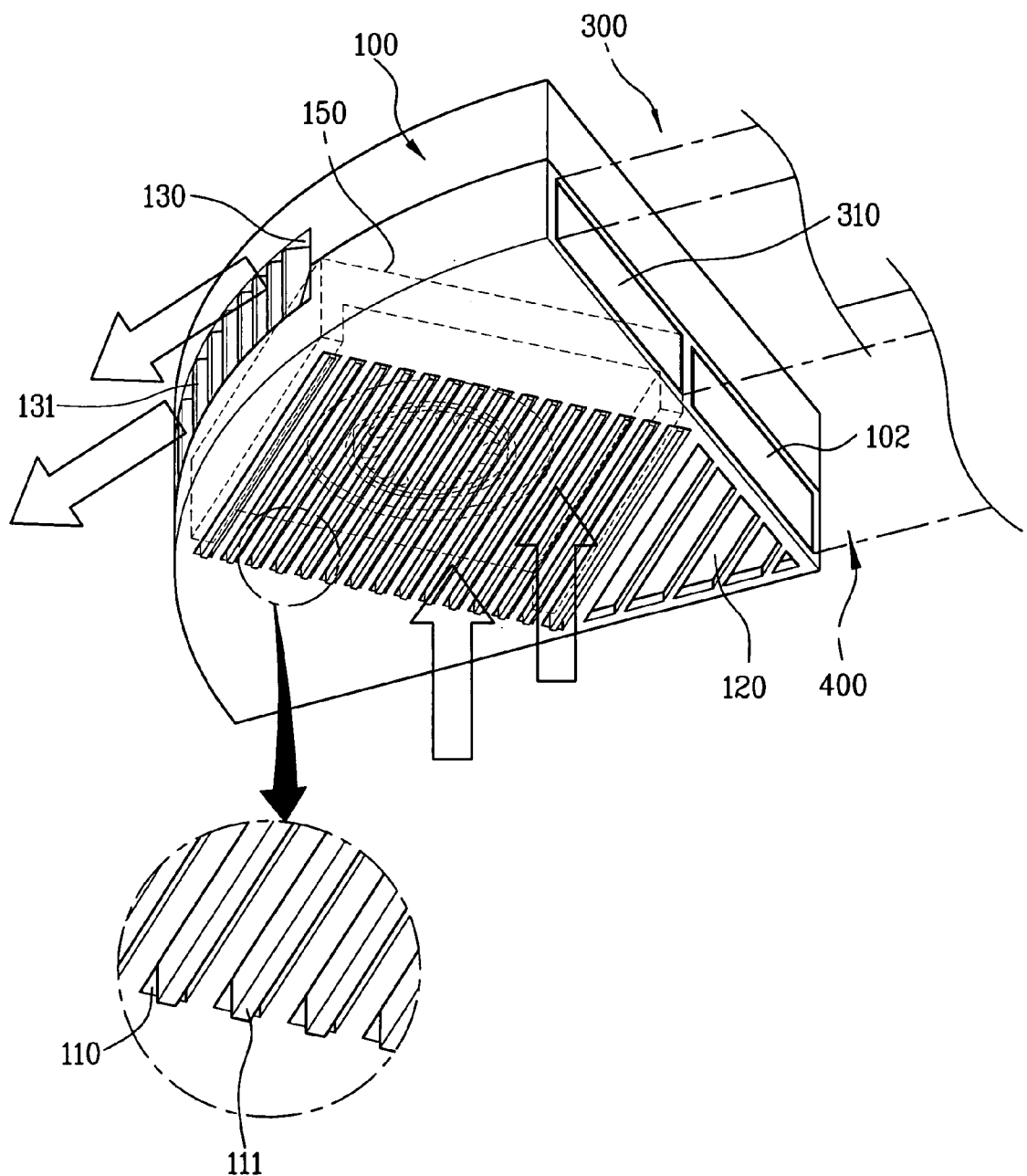
FIG. 3 is a perspective view of illustrating an air flow when purifying an indoor air with a ventilating system of FIG. 1.
Figure 4:
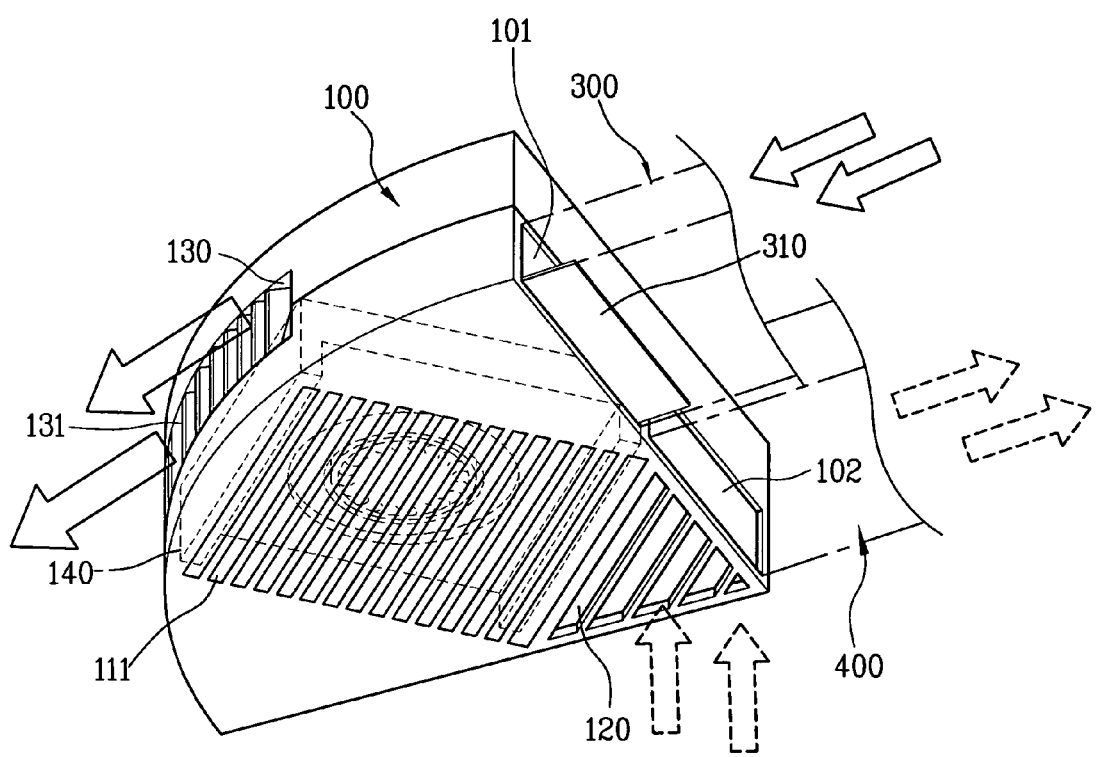
FIG. 4 is a perspective view of illustrating an air flow when ventilating a room with a ventilating system of FIG. 1.
Figure 5:
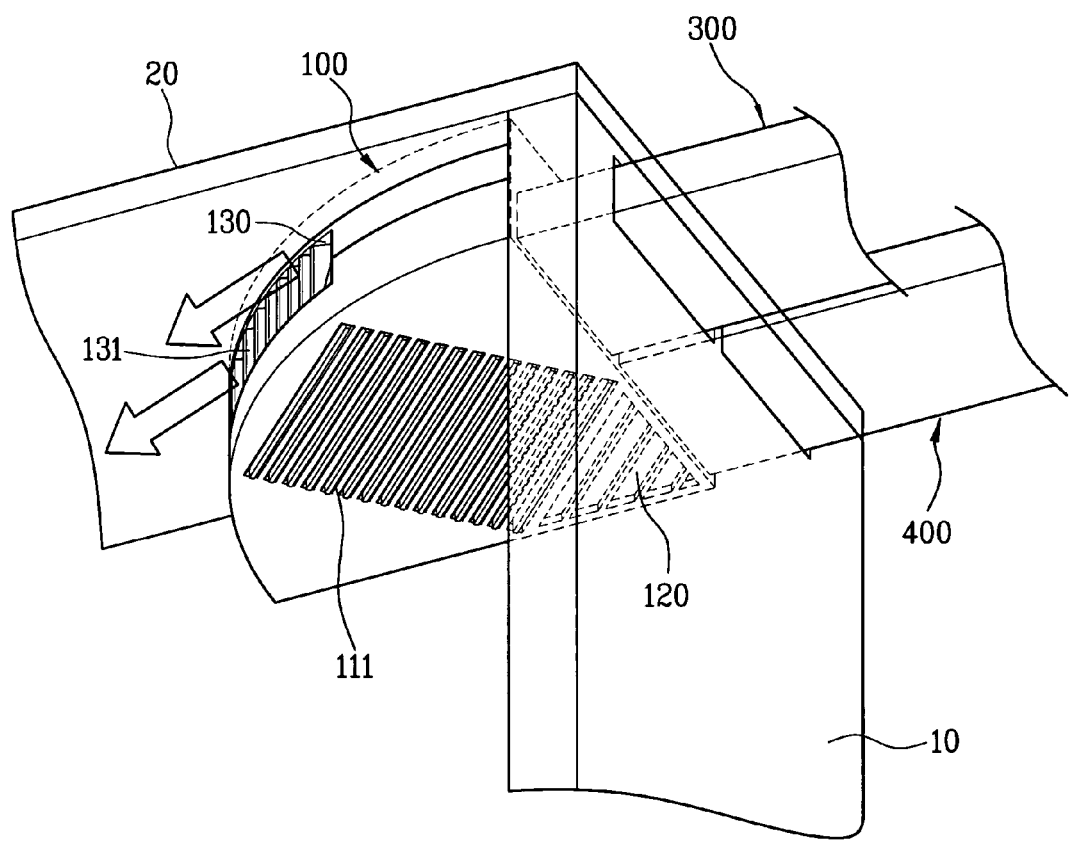
FIG. 5 and FIG. 6 are perspective views of illustrating examples of installing a ventilating system of FIG. 1 to the inside of a room.
Figure 6:
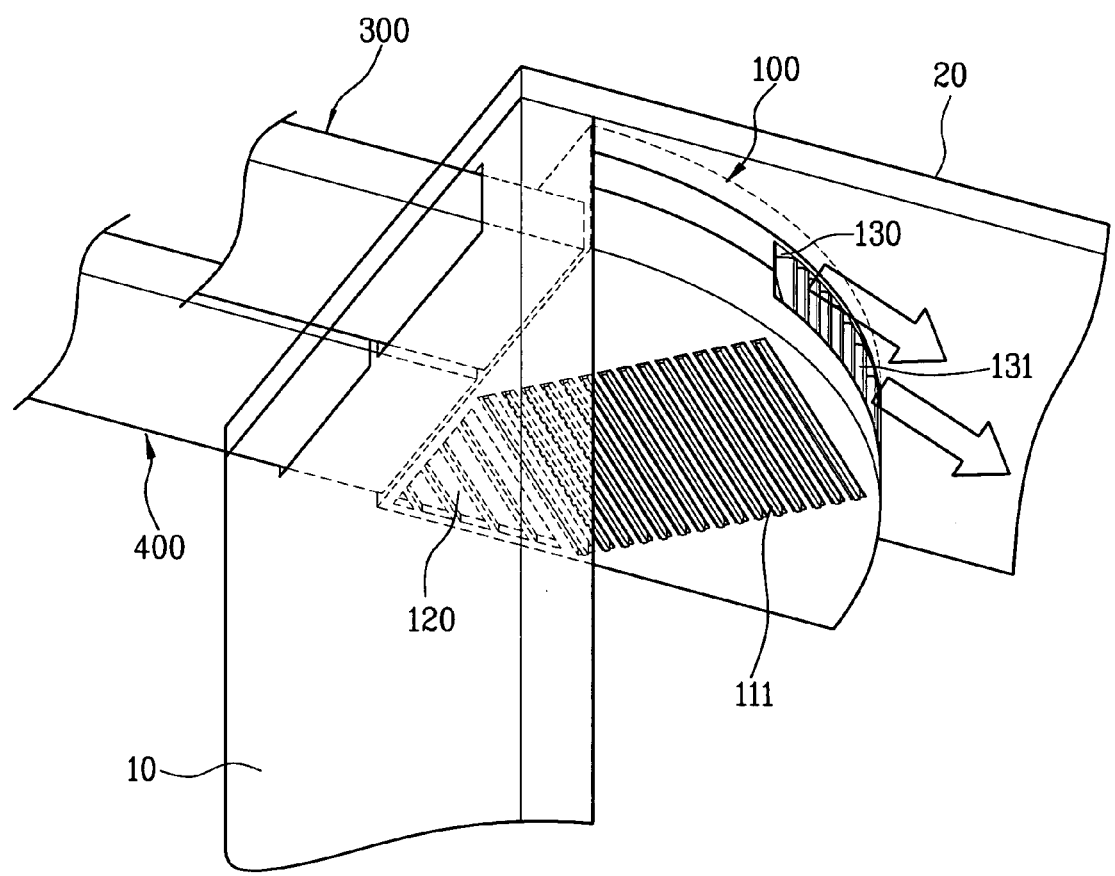

FIG. 1 is a schematic diagram of illustrating a ventilating system according to the first embodiment of the present invention. FIG. 2 is a cross sectional view along I-I' of FIG. 1. FIG. 3 is a perspective view of illustrating an air flow when purifying an indoor air with a ventilating system of FIG. 1. FIG. 4 is a perspective view of illustrating an air flow when ventilating a room with a ventilating system of FIG. 1. FIG. 5 and FIG. 6 are perspective views of illustrating examples of installing a ventilating system of FIG. 1 to the inside of a room.

In a ventilating system according to the related art, a case of the ventilating system is provided to a space between a ceiling and a floor of an upper story. In the meantime, a ventilating system according to the first embodiment of the present invention has a case 100, wherein one end of the case 100 is projected toward the inside of a room, and the other end is buried in a ceiling. More particularly, as shown in FIG. 1 and FIG. 2, the case 100 has two sides connected with each other for being adhered to the corner of a wall 10, and one front side being round toward the inside of the room.

For example, the case 100 is formed at a predetermined thickness. In this state, as shown in FIG. 1, the case 100 has a quadrant shape formed by dividing a circular shape into four parts. The case 100 has the two sides positioned at the corner of the wall 10 for being adhered to the wall 10, an upper end being buried in the ceiling, and a lower end being projected toward the inside of the room.

In this way the case 100 is positioned, some of the case 100 corresponding to a first height H1 (H1 of FIG. 2) is provided in a space between the ceiling and the bottom of the upper story, and the remaining of the case 100 corresponding to a second height H2 (H2 of FIG. 2) is provided in an inside space of the room under the ceiling.

Accordingly, the ventilating system according to the present invention may be easily installed to a building having a small distance between a floor of a lower story and a floor of an upper story, that is, a small height of one story. If using the ventilating system according to the present invention, it is possible to decrease a height of one story when constructing a new building.

The ventilating system according to the present invention has an air supplying passage of providing an outdoor air to the inside of the room, an air discharging passage of discharging an indoor air to the outside of the room, and an air circulating passage of circulating the indoor air, wherein each passage flows through the case 100.

Hereinafter, the air passages will be described in detail.

Through the air supplying passage, the outside of the room, the case 100, and the inside of the room are in communication with one another.

In case of the ventilating system according to the related art, after the air supplying passage of providing the outdoor air to the inside of the room flows through the space provided between the ceiling and the floor of the upper story, the air supplying passage is connected to the case 100.

Meanwhile, in case of the ventilating system according to the present invention, the air supplying passage penetrates the wall 10 without passing through the space provided between the ceiling and the floor of the upper story, and then the air supplying passage is directly connected with the side of the case 10 under the ceiling 20.

For example, the air supplying passage is comprised of a first port 101 provided in side of the case 100, an air-supplying duct 300 connected with the first port 101, and an air-discharging hole 130 provided in the case 100. The first port 101 is provided at any one side of the two sides of the case 100, for being positioned under the ceiling 20. Also, the air-supplying duct 300 is provided to penetrate the wall 100, wherein one end of the air-supplying duct 300 is connected with the outside of the room, the other end of the air-supplying duct 300 is connected with the first port 101 under the ceiling 20, and the air-discharging hole 130 is provided in the front of the case 100.

At this time, the first port 101 is provided at a lower portion in the side of the case 100, and the air-discharging hole 130 is provided at a central portion or an upper portion in the front of the case 100 under the ceiling 20. Also, as shown in FIG. 2, a guide passage 160 is provided in the case 100, wherein the guide passage 160 is slantingly provided from the inner upper portion of the case 100 to the air-discharging hole 130. In addition, as shown in FIG. 2, a flow-direction guide 131 may be additionally provided in the air-discharging hole 130, for controlling the flow direction of the air discharged to the inside of the room.

Accordingly, the outdoor air, introduced to a lower part of the case 100 through the air-supplying duct 300, moves to an upper part of the case 100, and then is discharged to the inside of the room through the guide passage 160 and the air-discharging hole 130. At this time, the air supplied to the inside of the room is discharged to a lower space of the room by the guide passage 160, and the air-supplying direction is determined by the flow-direction guide 131. In the meantime, for example, an air-supplying fan 320 may be provided in the air-supplying duct 300, as shown in FIG. 1, wherein the air-supplying fan 320 supplies the outdoor air to the inside of the room.

Through the air discharging passage, the inside of the room, the case 100, and the outside of the room are in communication with one another.

In the related art ventilating system, after the air discharging passage of discharging the indoor air to the outside of the room flows through the space formed between the ceiling and the floor of the upper story, the air discharging passage is connected to the case 100.

In the meantime, in case of the ventilating system according to the present invention, the air discharging passage penetrates the wall 10 without passing through the space formed between the ceiling and the floor of the upper story, and then the air discharging passage is directly connected with the case 100 under the ceiling 20.

For example, the air discharging passage is comprised of a second inlet 120 provided on the bottom of the case 100, a second port 102 provided in the side of the case 100, and an air-discharging duct 400 connected with the second port 102 and being in communication with the outside of the room. At this time, as shown in FIG. 1 to FIG. 3, the second inlet 120 may be formed of a plurality of slots.

For example, as shown in FIG. 1 to FIG. 3, the second inlet 120 may be formed of a plurality of slots. Also, for example, the second port 102 is provided in parallel with the first port 101 at the lower portion in the side of the case 100. Accordingly, the indoor air introduced to the case 100 through the second inlet 120 is discharged to the outside of the room through the air-discharging duct 400.

In more detail, as shown in FIG. 1, the air-discharging duct 400 may have an additional air-discharging fan 410 for discharging the introduced indoor air to the outside of the room. Furthermore, as shown in FIG. 1, another air-discharging fan 411 may be provided in the air-discharging duct 400, for improvement the efficiency in discharging the air.

Through the air circulating passage, the inside of the room is in communication with one point of the air supplying passage inside the case 100.

The air circulating passage introduces the indoor air to the case 100, and again supplies the introduced air to the inside of the room. For example, the air circulating passage is comprised of a first inlet 110 provided on the bottom of the case 100, and the air-discharging hole 130 provided in the front of the case 100. At this time, as shown in FIG. 1 to FIG. 3, the first inlet 110 may be formed of a plurality of slots, wherein the first inlet 110 is provided in parallel with the second inlet 120 on the bottom of the case 100.

The air circulating passage meets with the air supplying passage in the case 100. Accordingly, the indoor air introduced to the case 100 through the air circulating passage and the outdoor air introduced to the case 100 through the air supplying passage are supplied to the inside of the room through the air-discharging hole 130.

In the ventilating system according to the present invention, a preheat exchanger 500 may be additionally provided at an intersection of the air supplying passage and the air discharging passage, and more specifically, at an intersection of the air-supplying duct 300 and the air-discharging duct 400.

The preheat exchanger 500 includes a plurality of first passages for the flow of the outdoor air, and a plurality of second passages for the flow of the indoor air, wherein the second passages are provided in-between the first passages. Then, a plate is provided between each of the first passages and each of the second passages. As a result, the outdoor air supplied to the inside of the room through the air-supplying duct 300 is indirectly heat-exchanged with the indoor air discharged to the outside of the room through the air-discharging duct 400 in the preheat exchanger 500.

In the meantime, as shown in FIG. 2, a fan 210 is provided in the case 100, wherein the fan 210 supplies the air introduced to the case 100 through the air supplying passage or the air circulating passage to the inside of the room. The fan 210 supplies the outdoor air introduced to the inside of the case 100 through the air-supplying duct 300 connected with the lower portion in the side of the case 100 to the inside of the room. Also, the fan 210 supplies the indoor air flowing into the case 100 through the first inlet 110 formed on the bottom of the case 100 to the inside of the room, again. For example, the fan 210 may be formed of a cross flow fan of inhaling the air at an axis direction, and discharging the inhaled air at a radius direction. In this case, it is possible to obtain compactness in the case 100, and to improve the efficiency in the fan 210.

As shown in FIG. 2, a division plate 150 may be provided in the case 100, wherein the division plate 150 divides the inside space of the case 100 into a lower space and an upper space. Also, an opening 151 is provided in the division plate 150, for communication between the lower space and the upper space of the case 100. As shown in FIG. 2, the fan 210 is positioned in the opening 151.

Accordingly, the air introduced to the lower space of the case 100 through the first inlet 110 or the air-supplying duct 300 is provided to the lower side of the fan 210 through the opening 151, and then is discharged to the upper space of the case 100. After that, the air discharged to the upper space of the case 100 moves along the guide passage 160 inclined toward the inside of the case 100, and then the air is provided to the inside of the room through the air-discharging hole 130 provided at the lower portion in the front of the case 100.

In addition, an air guide 140 may be additionally provided in the case 100, for separating the air supplying passage from the air discharging passage. As shown in FIG. 2, for example, the air guide 140 is provided to the lower space of the case 100, for separation of the first inlet 110 and the second inlet 120. Accordingly, the air guide 140 guides the air introduced to the case 100 through the air-supplying duct 300 or the first inlet 110 toward the air-discharging hole 130, and guides the air introduced to the case 100 through the second inlet 120 toward the air-discharging duct 400.

Also, at least one louver 111 is provided in the air circulating passage, for opening and closing the air circulating passage. For example, as shown in FIG. 2 and FIG. 3, the louver 111 is provided for opening and closing the first inlet 110. In this case, the first inlet 110 is provided with a plurality of slots, whereby the several louvers 111 are provided for opening and closing the respective slots.

Also, when the outdoor air is introduced to the inside of the room through the air supplying passage with the ventilating system, the louver 111 closes the first inlet 110. In the meantime, when circulating the indoor air by using the air circulating passage with the ventilating system, the louver 111 opens the first inlet 110.

Furthermore, a damper 310 may be provided in the air supplying passage, for opening and closing the air supplying passage. For example, as shown in FIG. 1, FIG. 3 and FIG. 4, the damper 310 is provided to open and close the first port 101. That is, the damper 310 opens the first port 101 when supplying the outdoor air to the inside of the room through the air supplying passage with the ventilating system. In the meantime, the damper 310 closes the first port 101 when circulating the indoor air by using the air circulating passage with the ventilating system.

Then, a filter member 600 may be provided in the case 100. For example, the filter member 600 is positioned under the fan 210, wherein the filter member 600 purifies the outdoor air introduced to the inside of the case 100 through the air-supplying duct 300 and the indoor air introduced to the inside of the case 100 through the first inlet 110.

At this time, the air purified by the filter member 600 in the case 100 is provided to the room space through the air-discharging hole 130. Accordingly, when ventilating and circulating the room air with the ventilating system according to the present invention, it is possible to provide the purified clean air to the room space since the filter member 600 is provided in the ventilating system.

As shown in FIG. 2, for example, the filter member 600 is provided with a dust-collecting filter 610, photo-catalyst 620, and active carbon 630. The dust-collecting filter 610 filters dust from the air, and the photo-catalyst 620 and the active carbon 630 are carbon having a strong adsorption capability, and absorb odor from the air.

The dust-collecting filter 610 may be used of an HEPA (High Efficiency Particulate Arrestor) filter, or an ULPA (Ultra Low Penetration Absolute) filter. At this time, the HEPA filter can remove particles, such as dust, bacteria, virus, and the like, larger than 0.3 micron, up to 99.97%, and the ULPA filter, having a better performance than the HEPA filter, can remove particles, such as fine dust, bacteria, dandruff, mold, pollen, radon-decay product, smoke, and the like, with a size ranging 0.1~0.01 micron, up to 99.999%. Also, the photo-catalyst 620 is one kind of catalysts, wherein catalysis is performed with light energy. At this time, the photo-catalyst 620 may be used of $TiO_2$, $ZnO$, $CdS$, $ZrO_2$, $SnO_2$, $V_2O_2$, or $WO_3$.

Referring to FIG. 5 and FIG. 6, the aforementioned ventilating system according to the present invention may be installed in various positions according to the structure of the building.

For example, as shown in FIG. 5, if it is convenient to provide the air-supplying duct 200 and the air-discharging duct 300 connected with the inside of the room by penetrating the right-side wall 10, the case 100 is positioned at the right-side corner of the room. Thus, the air-supplying duct 200 and the air-discharging duct 300 are connected with the right side of the case 100.

In the meantime, if it is convenient to provide the air-supplying duct 200 and the air-discharging duct 300 connected with the inside of the room by penetrating the left-side wall 10, the case 100 is positioned at the left-side corner of the room. Thus, the air-supplying duct 200 and the air-discharging duct 300 are connected with the left side of the case 100.

The ventilating system according to the first embodiment of the present invention is operated as a first operation mode for circulating and purifying the indoor air, and a second operation mode for ventilating the room air by introducing the outdoor air to the inside of the room.

Hereinafter, the respective operation modes of the ventilating system according to the first embodiment of the present invention will be described with reference to FIG. 3 and FIG. 4.

Referring to FIG. 3, on the first operation mode, the damper 310 closes the first port 101, and the louver 111 opens the first inlet 110. Although not shown, on the first operation mode, air-discharging fans 410 and 411 are not driven. Accordingly, the indoor air is not discharged to the outside of the room through the air-discharging duct 400. With operation of the fan 210 in the case 100, the polluted indoor air is introduced to the lower space of the case 100 through the first inlet 110 formed on the bottom of the case 100.

After that, the polluted air introduced to the lower space of the case 100 passes through the filter member 600 and the fan 210, and then the filtered clean air is discharged to the upper space of the case 100. At this time, the filter member 600 is provided with the dust-colleting filter 610, the photo-catalyst 620, and the active carbon 630, which remove the foreign matters from the polluted air, thereby purifying the air. Thereafter, the purified clean air is introduced to the upper space of the case 100, and then is provided to the room space through the air-discharging hole 130.

During this process, the damper 310 closes the first port 101, so that the outdoor air is not introduced to the case 100 through the air-supplying duct 300. As a result, only the indoor air flows into the case 100, and the indoor air is purified in the case 100. After that, the purified air is discharged to the room space. Thus, the ventilating system according to the present invention continuously circulates and purifies the indoor air.

Next, as shown in FIG. 4, on the second operation mode, the damper 310 opens the first port 101, and the louver 111 closes the first inlet 110. As operating the air-supplying fan 320 inside the air-supplying duct 300, and the fan 210 inside the case 100, the outdoor air flows into the lower space of the case 100 through the air-supplying duct 300 and the first port 101. Then, as the outdoor air provided to the lower space of the case 100 passes through the filter member 600, the outdoor air is purified. After that, the purified air moves to the upper space of the case 100, and then is provided to the room space through the air-discharging hole 130. As described above, during this process, the louver 111 closes the first inlet 110, whereby the indoor air is not provided to the case 100 through the first inlet 110.

In the meantime, as the air-discharging fans 410 and 411 are operated, the indoor air is supplied to the inside of the case 100 through the second inlet 120, and more particularly, to the lower space of the case 100 through the second inlet 120. At this time, the first inlet 110 and the second inlet 120 are separated from each other by using the air guide 140. Accordingly, the indoor air introduced to the case 100 through the second inlet 120 is not mixed with the outdoor air introduced to the case 100 through the air-supplying duct 300. The indoor air introduced to the case 100 through the second inlet 120 is discharged to the outside of the room through the second port 102 and the air-discharging duct 400.

Herein, the preheat exchanger 500 indirectly heat-exchanges the outdoor air flowing through the air-supplying duct 300 with the indoor air flowing through the air-discharging duct 400. That is, when ventilating the room air, the outdoor air introduced to the inside of the room is heated or cooled by the indoor air discharged to the outside of the room, and then the heated or cooled air is provided to the room space, thereby preventing the rapid change on the inside temperature of the room space.

In the aforementioned description, the louver 111 is provided in the first inlet 110. However, it is not limited to this, that is, the louver 111 may not be provided. In this case, when ventilating the room air, the outdoor air is provided to the case 100 through the first port 101, and the indoor air is provided to the case 100 through the first inlet 110.

Accordingly, the ventilating system according to the present invention continuously introduces the outdoor air to the inside of the room, and simultaneously circulates the indoor air. In this state, the outdoor air introduced to the inside of the room and the circulating indoor air are purified by the filter member 600 of the case 100, and then the purified air is provided to the room space.

Figure 7:
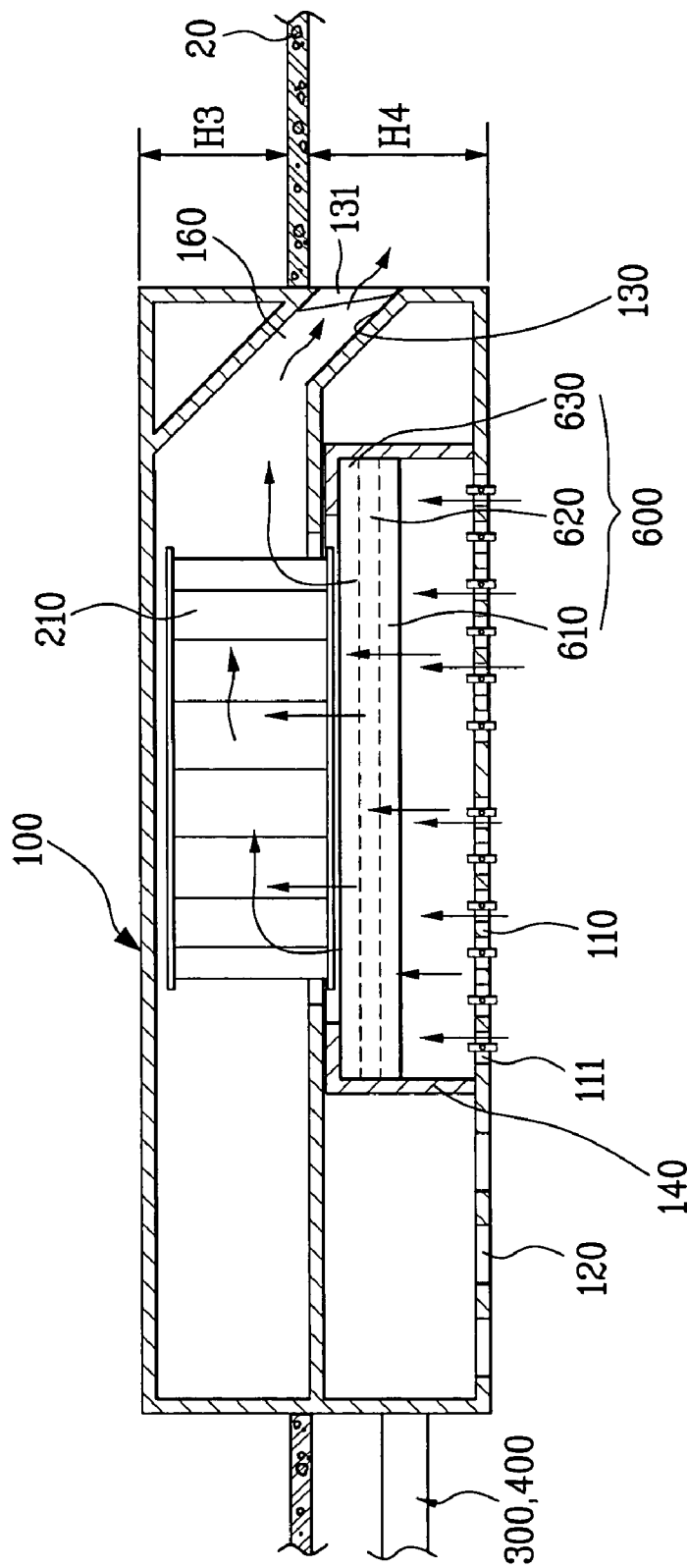
FIG. 7 is a schematic diagram of illustrating a ventilating system according to the second embodiment of the present invention.
Figure 8:
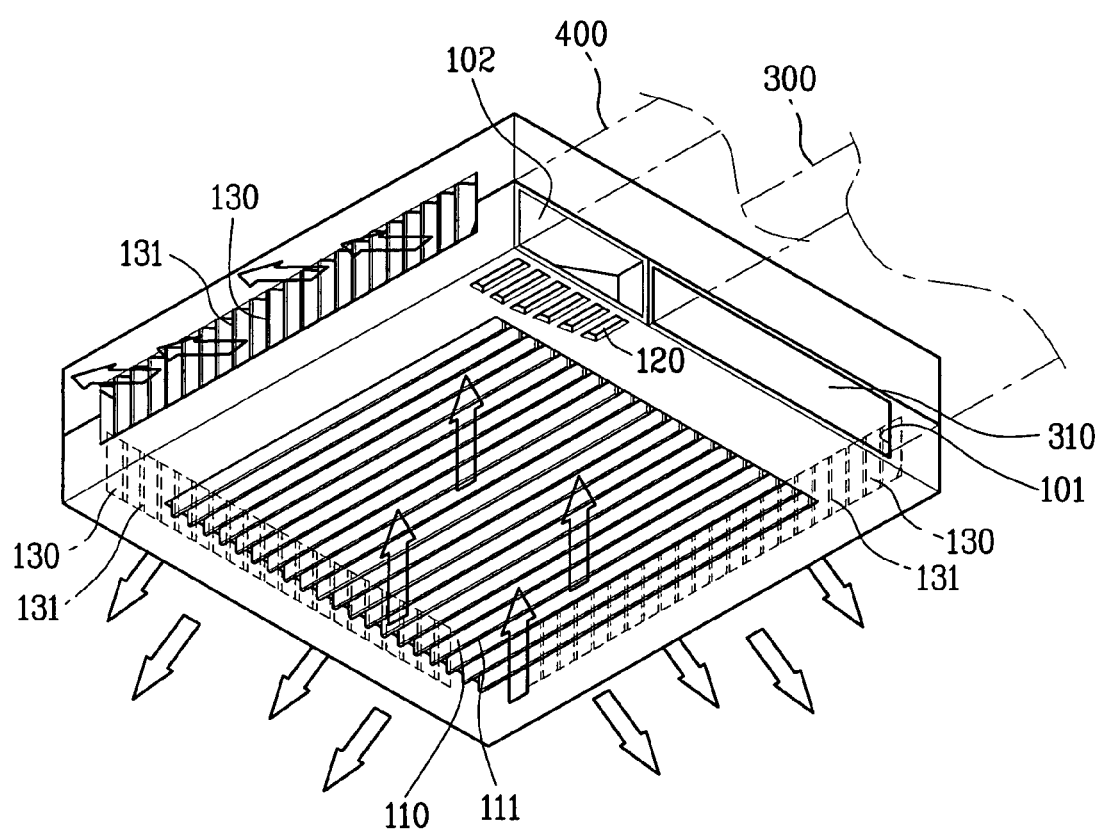
FIG. 8 is a perspective view of illustrating an air flow when purifying an indoor air with a ventilating system of FIG. 7.
Figure 9:
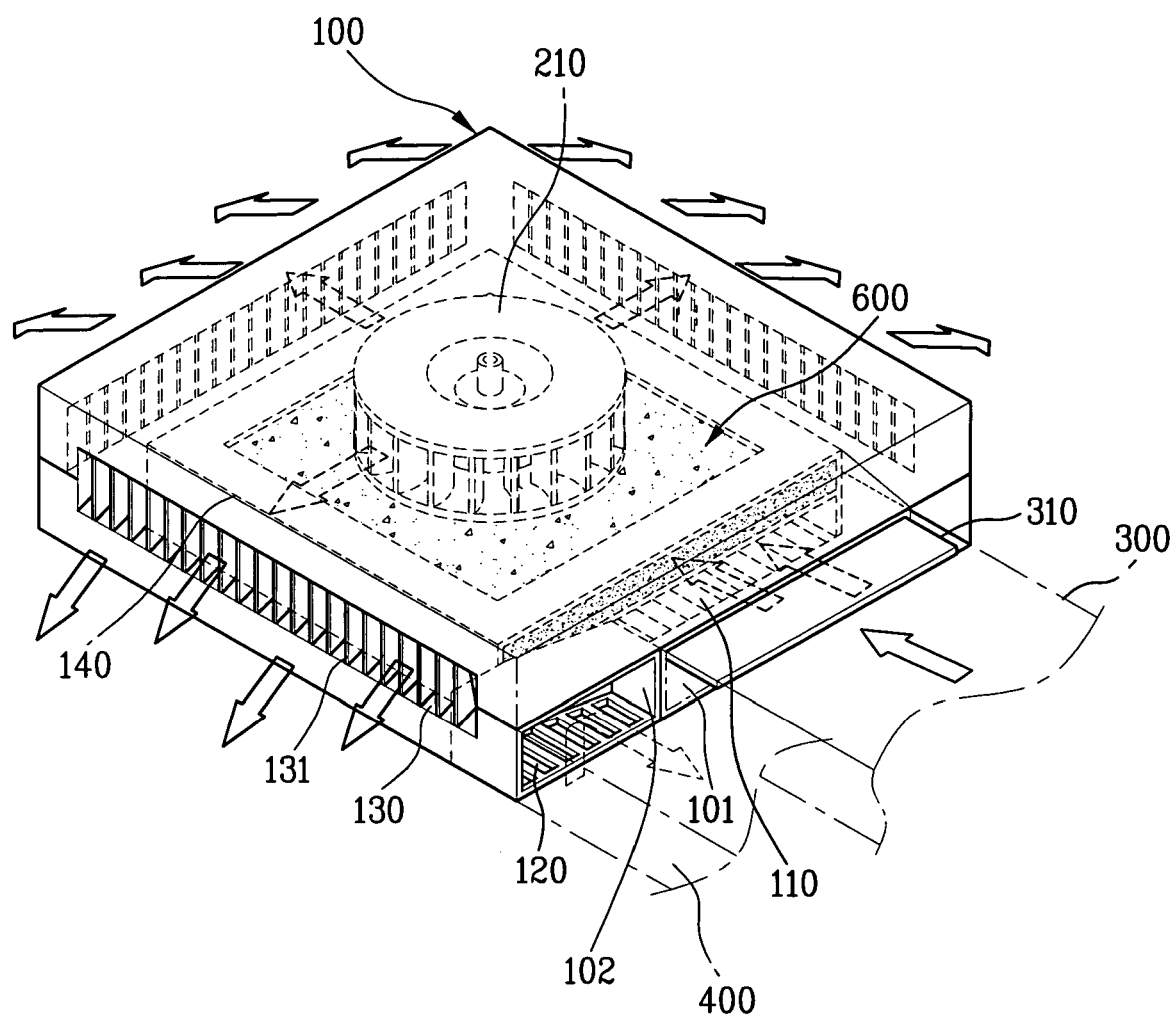
FIG. 9 is a perspective view of illustrating an air flow when ventilating a room with a ventilating system of FIG. 7.

In the meantime, FIG. 7 is a schematic diagram of illustrating a ventilating system according to the second embodiment of the present invention. FIG. 8 is a perspective view of illustrating an air flow when purifying an indoor air with a ventilating system of FIG. 7. FIG. 9 is a perspective view of illustrating an air flow when ventilating a room with a ventilating system of FIG. 7.

Hereinafter, the ventilating system according to the second embodiment of the present invention will be described with reference to FIG. 7, FIG. 8 and FIG. 9.

The ventilating system according to the second embodiment of the present invention is similar in structure to the ventilating system according to the first embodiment of the present invention, so that the detailed explanation for the structure of the ventilating system according to the second embodiment of the present invention will be omitted. That is, the differences between the first embodiment and the second embodiment will be described in chief.

In the same way as the ventilating system according to the first embodiment of the present invention, the ventilating system according to the second embodiment of the present invention has a case 100, wherein an upper end of the case 100 is buried in a ceiling, and a lower end of the case 100 is projected toward the inside of a room.

In the ventilating system according to the first embodiment of the present invention, the case is formed in the flat-quadrant shape. In the meantime, in case of the ventilating system according to the second embodiment of the present invention, the case 100 is formed in a flat quadrate shape, as shown in FIG. 8 and FIG. 9.

Also, in the ventilating system according to the first embodiment of the present invention, the air-discharging hole 130 is provided in the front of the case 100, for discharging the air to the room space. However, in the ventilating system according to the second embodiment of the present invention, air-discharging holes 130 are provided at both sides of the case 100 as well as the front side of the case 100. Accordingly, in case of the ventilating system according to the second embodiment of the present invention, one side of the case 100 is adhered and fixed to a wall of the room, and the air is provided to the inside of the room through the air-discharging holes 130 formed in the front side and the both sides of the case 100, as shown in FIG. 8 and FIG. 9.

The ventilating system according to the second embodiment of the present invention may have one side being adhered and fixed to the wall of the room, as shown in FIG. 8 and FIG. 9.

However, the ventilating system according to the second embodiment of the present invention may be installed at a corner of a ceiling in the room. In this case, the two sides of the case 100 are adhered to the wall of the room, so that any one of the two air-discharging holes 130 formed on the two sides adjacent to the front side of the case 100 is positioned close to the wall of the room. Thus, the air discharged through any one air-discharging hole 103 comes into collision with the wall of the room, thereby generating turbulent air and noise.

Figure 10:
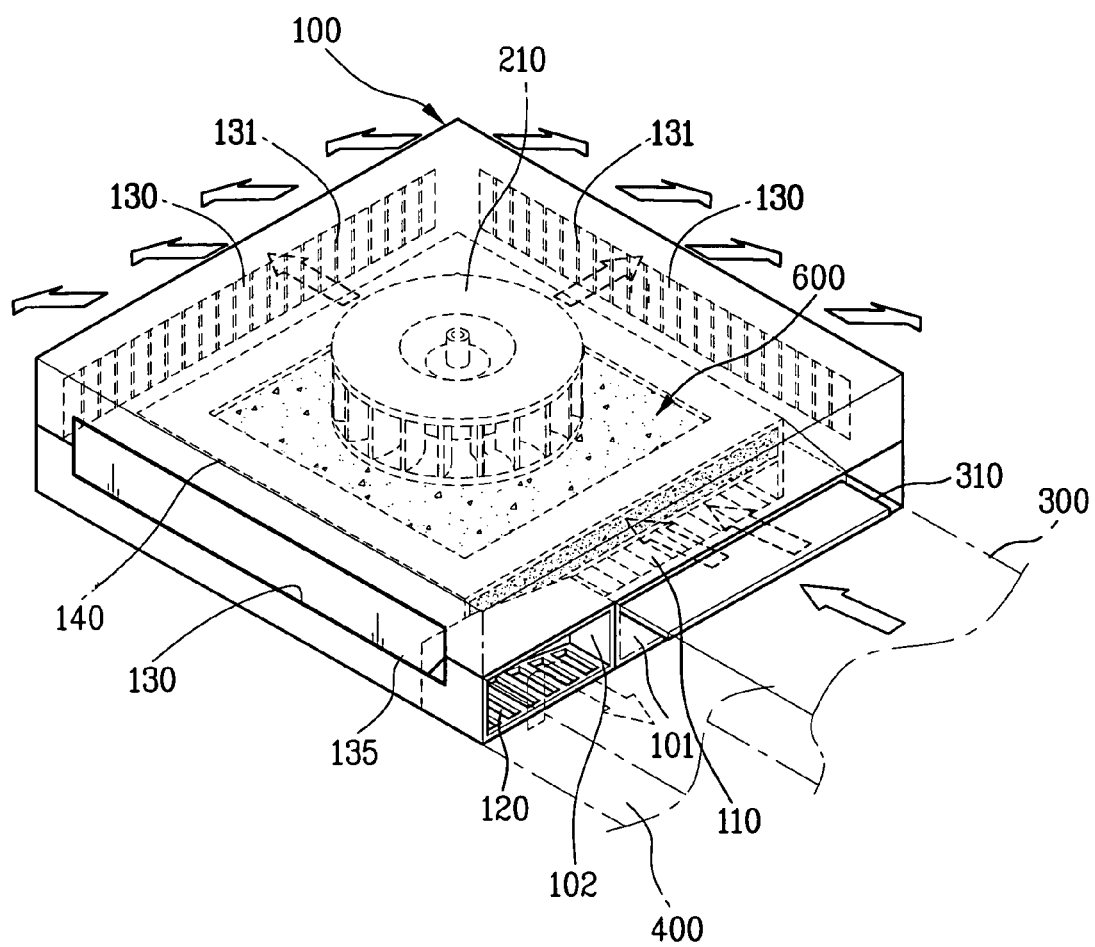
FIG. 10 is an exemplary perspective view of illustrating a ventilating system of FIG. 7 having a damper at any one discharging hole therein.

In order to prevent this problem, as shown in FIG. 10, a damper 135 is provided to the air-discharging hole 130 adjacent to the wall, for closing the air-discharging hole 130. Thus, the air inside the case 100 is discharged to the room space through the two air-discharging holes 130 of the case 100, as shown in FIG. 10.

As described above, the ventilating system according to the second embodiment of the present invention is very similar to the ventilating system according to the first embodiment of the present invention in the shape of the case 100, the position of the air-discharging holes 130, and the damper 135 provided in the air-discharging hole 130, as shown in FIG. 7 to FIG. 10. Accordingly, the detailed explanation for the structure and function of the ventilating system according to the second embodiment of the present invention will be omitted.

As described above, the ventilating system according to the present invention has the following advantages.

In the ventilating system according to the present invention, it is possible to perform two functions of circulating the indoor air and the purifying the indoor air with one unit, thereby decreasing the cost in purchasing the device of ventilating and purifying the air.

Also, the air-supplying duct and the air-discharging duct are connected to one side of the case, so that it is possible to lower a height of the ventilating system at a degree corresponding to a height in each duct. Also, one end of the case is buried in the ceiling of the room, and the other end of the case is projected toward the room space. In this sate, the air-supplying duct and the air-discharging duct are in direct connection with the case under the ceiling. As a result, there is no requirement for obtaining a large space between the ceiling and the bottom of the upper story. That is, it is possible to decrease the distance between the ceiling and the bottom of the upper story, thereby decreasing the initial cost in constructing the building. Also, the number of stories increases, for improvement of the spatial efficiency.

Also, each duct may be connected with one side from the two sides of the case. Thus, each duct may be selectively connected with one side of the two sides of the case, in due consideration of the structure of outer walls for installing the ventilating system.

Furthermore, the filter member is provided in the case, so that the purified clean outdoor air and indoor air is provided to the room space, thereby obtaining the more comfortable room environment.

In addition, the cross flow fan is provided to forcibly inhale the indoor air and the outdoor air, so that it is possible to prevent the decrease in the air supplying amount, generated by the increase in the loss of pressure, even in case of the high-performance dust-collecting filter is provided in the filter member.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A ventilating system comprising:
a case having a first end locatable above a ceiling of a room, a second end opposite to the first end and locatable below the ceiling of the room and inside of the room, and a lateral side surface, the case including a first port at the lateral side surface thereof and connected to an air-supplying duct for introducing an outdoor air into the room; a second port at the lateral side surface thereof and connected to an air-discharging duct for discharging an indoor air to outside of the room; and an air-circulating passage in the case for introducing the indoor air into the case, and for re-supplying the air to the introduced indoor air into the room;
an air guide located in the case, the air guide including a vertical division plate located in the case, the vertical division plate extending from the lateral side surface of the case at a location between the first port and the second port, the vertical division plate separating an indoor airflow into the case to be re-supplied into the room and an indoor airflow into the case to be discharged to outside of the room;
a damper provided at the first port, for opening and closing the first port;
a louver provided in the air circulating passage, for opening and closing the air circulating passage;
a filter member provided in the air circulating passage, for purifying the room air or the outdoor air introduced to the case; and
a single fan located in the air-circulating passage for supplying the outdoor air introduced from the first port to the room or for re-supplying the room air inhaled from the room, after purifying by the filter member;
wherein the damper closes the air-supplying passage and the louver opens the air-circulating passage in purifying the room air, and the damper opens the air-supplying passage and the louver closes the air-circulating passage in supplying the outdoor air to the room.

2. The ventilating system as claimed in claim 1, wherein the case is formed in a flat-quadrant shape, for being positioned at a corner of the ceiling in the room.

3. The ventilating system as claimed in claim 1, wherein the case is formed in a flat-quadrate shape, and one side of the case is positioned adjacent to the wall of the room.

4. The ventilating system as claimed in claim 1, wherein the case has a round frontal side for supplying the indoor air or the outdoor air introduced into the case to inside of the room.

5. The ventilating system as claimed in claim 1, further comprising a preheat exchanger provided at an intersection between the air-supplying duct and the air-discharging duct, for indirect heat-exchange of the outdoor air supplied to inside of the room and the indoor air discharged to outside of the room.

6. The ventilating system as claimed in claim 1, wherein the fan inhales the air at an axial direction, and then discharges the air at a radius direction, and no additional fan is located in the case.

7. The ventilating system as claimed in claim 1, wherein at least one air-discharging hole is provided in the side wall of the case.

8. The ventilating system as claimed in claim 7, wherein the at least one air-discharging hole includes a plurality of air-discharging holes formed at both sides adjacent to the front side of the case.

9. The ventilating system as claimed in claim 7, wherein the case includes a guide passage slantingly provided from an inner upper portion of the case to the air-discharging hole.

10. The ventilating system as claimed in claim 1, wherein the case includes a first inlet and a second inlet provided on the bottom of the case, and the first and the second inlets are connected to the first and second port each.

11. The ventilating system as claimed in claim 1, further comprising a horizontal division plate in the case for dividing the case into a lower space and an upper space, the horizontal division plate having an opening communicating the lower space and the upper space, the vertical division plate extending downwardly from a bottom surface of the horizontal division plate.

12. The ventilating system as claimed in claim 11, wherein the fan is located at the opening of the horizontal division plate, and no additional fan is located in the case.

13. The ventilating system as claimed in claim 12, wherein the fan is partially within the opening of the horizontal division plate.

14. The ventilating system as claimed in claim 12, wherein the air guide separates the outdoor air supplied at the first port from the indoor air inhaled into the case.

15. The ventilating system as claimed in claim 1, wherein the direction of inhaling and supplying of the indoor air are different.

16. The ventilating system as claimed in claim 1, wherein the fan is located between the air-supplying duct and the air-discharging hole.

17. The ventilating system comprising:
a case having a first end locatable above a ceiling of a room, a second end opposite to the first end and locatable below the ceiling of the room and inside of the room and a lateral side surface, the case including a first inlet for inhaling an indoor air to re-supply to the room; a second inlet for inhaling the indoor air to discharge outside of the room; an air-discharging hole to supply the air introduced into the case to the room; a first port at the lateral side surface thereof to receive an outdoor air; and a second port at the lateral side surface thereof to discharge the indoor outside of the case;
a louver provided at the first inlet, for opening or closing the first inlet;
a damper provided at the first port, for opening or closing the first port;
an air guide located in the case for separating the outdoor air supplied at the first port from the indoor air inhaled at the second inlet, the air guide including a vertical division plate located in the case, the vertical division plate extending from the lateral side surface of the case at a location between the first port and the second port, the vertical division plate separating an indoor airflow into the case to be re-supplied into the room and an indoor airflow into the case to be discharged to outside of the room;
a single fan located in the case for supplying the outdoor air toward the air-discharging hole and for inhaling the indoor air into the case; and
a filter member provided in the case, for purifying the room air or the outdoor air introduced to the case;

wherein the damper closes the first port and the louver opens the first inlet in purifying the room air, and the damper opens the first port and the louver closes the first inlet in ventilating the room.

18. The ventilating system as claimed in claim 17, wherein the air guide guides the air introduced from the first port or the first inlet to inside of the case toward the air-discharging hole, and guides the air introduced from the second inlet to inside of the case toward the second port.

19. The ventilating system as claimed in claim 17, wherein the case includes a guide passage slantingly provided from an inner upper portion of the case to the air-discharging hole.

* * * * *